United States Patent [19]

Dona et al.

[11] Patent Number: 5,723,919
[45] Date of Patent: Mar. 3, 1998

[54] MICROMETER WITH SIMPLIFIED BEARINGS

[75] Inventors: Marinus J.J. Dona; Karim Lefki, both of Eindhoven, Netherlands

[73] Assignee: U.S. Philips Corporation, New York, N.Y.

[21] Appl. No.: 647,861

[22] Filed: May 15, 1996

[30] Foreign Application Priority Data

Nov. 24, 1995 [EP] European Pat. Off. ............. 95203235

[51] Int. Cl.⁶ .......................... H02K 57/00; H02K 7/10
[52] U.S. Cl. .................. 310/40 MM; 310/90; 384/428; 384/434
[58] Field of Search ................. 310/90, 40 MM; 384/100, 110, 428, 434

[56] References Cited

U.S. PATENT DOCUMENTS

| | | | |
|---|---|---|---|
| 4,335,323 | 6/1982 | Kebbon et al. | 310/40 R |
| 4,685,813 | 8/1987 | Moog | 384/118 |
| 4,756,632 | 7/1988 | Belanger | 384/297 |
| 4,820,949 | 4/1989 | Mizobuchi et al. | 310/90 |
| 5,109,171 | 4/1992 | Schmider | 310/51 |
| 5,173,797 | 12/1992 | Zedekar et al. | 359/212 |
| 5,223,756 | 6/1993 | Bello | 310/90 |
| 5,408,151 | 4/1995 | Perrot et al. | 310/40 MM |

FOREIGN PATENT DOCUMENTS 0619642  10/1994  European Pat. Off. ....... H02K 57/00

Primary Examiner—Steven L. Stephan
Assistant Examiner—Tran Nguyen
Attorney, Agent, or Firm—Edward Blocker

[57] ABSTRACT

A micromotor includes a magnetic rotor fixed on a shaft. A stator has at least one winding. Bearings are provided to rotatably support the shaft relative to the stator. The bearings include a first silicon substrate having a V-groove, with a pair of bounding walls. Both bounding walls extend parallel to the shaft. The bearings also include a second silicon substrate having a third bounding wall which also extends parallel to the shaft. The shaft is positioned relative to the stator by the three bounding walls.

8 Claims, 4 Drawing Sheets

MICROMETER WITH SIMPLIFIED BEARINGS

BACKGROUND OF THE INVENTION

The invention relates to a micromotor comprising a magnetic rotor secured to a shaft, a stator having at least one winding and bearing means to support the shaft rotatably relative to the stator, the beating means including a first part comprising a silicon substrate.

The invention also relates to a method of manufacturing a micromotor.

Such a micromotor is known from EP 0 619 642 A2. The known micromotor comprises a silicon substrate carrying a winding layer, a shaft perpendicular to the substrate carrying a permanent magnet rotor, a spacer connected to the winding layer and a cap connected to the spacer. The substrate supports the shaft in its axial direction and the winding layer and the cap have a bearing to support the shaft in the radial direction. The known motor comprises many parts, which each have to be made with accurate dimensions in different processes and hence are costly. Since the outer dimensions of the micromotor are only a few millimeters, the assembly of the known micromotor requires accurate positioning of the parts relative to each other, which is time-consuming and requires relatively expensive tools.

SUMMARY OF THE INVENTION

It is an object of the invention to provide a micromotor which has a simple structure and is easy to assemble. It is another object of the invention to provide a micromotor whose components can be made at low cost.

The micromotor according to the invention is characterized in that the first part comprises at least one groove with a first bounding wall and a second bounding wall, said bounding walls extending parallel to the shaft, the bearing means further comprising a second part with at least a third bounding wall extending parallel to the shaft, the shaft being positioned relative to the stator by said bounding walls. Due to these measures the shaft with the rotor can simply be placed in the groove in the first part and can be retained by placing the second part over the first part and the shaft. Hence, assembly becomes very easy because the shaft will engage the groove as it is shifted over the surface comprising the groove. Preferably, the groove has a V-shape with an opening larger than the diameter of the shaft, so that the shaft readily engages the groove. It has been found that V-grooves can be etched in crystalline silicon (100) with a very high accuracy and with very smooth walls by means of known photolithographic techniques employing a mask. This accuracy and the smooth walls result in a high quality of the bearing means. Moreover, these techniques and silicon have been used for other applications such as integrated circuits, so that a lot of know-how is available. Additionally, the vast activities for these other applications have resulted in very low manufacturing costs. Furthermore, etching of silicon parts is extremely suited for small parts because the parts can be batch-processed as wafers, which facilitates handling of the parts. The wafers are split into individual parts as a last step.

An embodiment of the micromotor according to the invention is characterized in that the second part has a groove comprising said third bounding wall and a fourth bounding wall. By providing a groove in the second part the second part can easily be aligned relative to the first part by shifting the second part over a stack of the first part and the shaft with the rotor until the shaft slides into the groove of the second part.

An embodiment of the micromotor according to the invention is characterized in that the second part comprises a silicon substrate. This measure will improve the friction characteristics of the bearing means. Preferably, the first and the second part are identical so that diversity in motor parts is reduced, which has a positive effect on design and manufacturing costs.

An embodiment of the micromotor according to the invention is characterized in that the first part and/or second part carry the windings. By mounting the windings on the first and/or the second part the number of parts is reduced and a well-defined position of the windings relative to the rotor is obtained. The windings may consist of copper strips or wires which are glued to the first and/or second part. Alternatively, the windings may be electroformed on a metallic pattern on the first or second part, which pattern may be obtained by etching a metal coating through a photolithographic mask.

An embodiment of the micromotor according to the invention is characterized in that the first part and the second part together form a housing which accommodates the rotor. As the micromotor according to the invention is assembled by stacking the parts on each other, the first and second part can each be formed as a half shell which after assembly form a housing for the rotor. Due to these measures the number of parts is further reduced.

An embodiment of the micromotor according to the invention is characterized in that the first part and/or the second part comprise two grooves which are in line with each other and the grooves are separated by a chamber. Due to these measures the shaft is supported at two sides of the rotor. This results in an accurate positioning of the rotor and makes it possible to reduce the bearing length, so that the dimensions of the micromotor can be reduced. The chamber will accommodate the rotor, which usually has a larger diameter than the shaft. Such a chamber can easily be etched in a silicon substrate in the same process as is used to etch the grooves and merely requires an adaptation of the photolithographic mask.

An embodiment of the micromotor according to the invention is characterized in that the windings are formed by a first single winding in a first plane and a second winding in a second plane, the first plane and the second plane being perpendicular to each other and being parallel to the shaft, said first and second windings each comprising a single turn. It has been found that a satisfactorily working micromotor is already obtained with two such windings. The windings are both energized with a sinusoidal current, the currents for the two windings having a phase difference of 90 degrees. Although the current may be large, the total power dissipated in the micromotor remains low due to the low electrical resistance of the windings. This embodiment is particularly advantageous for applications where the motor can be used only once and the driving electronics for the motor is used many times. In such applications, for example when a motor is used in diagnostic equipment which enters the human body, the motor must be cheap and the driving electronics may be expensive.

The method according to the invention comprises the steps of providing a chamber and at least one groove in line with each other in a first part, stacking a rotor secured to a shaft onto the first part, the rotor being at least partly positioned in the chamber and the shaft being at least partly positioned in the grooves, stacking a second part onto a stack comprising the first part and the rotor, in order to retain the shaft in the grooves, and securing the first part to the second part. The method according to the invention requires no or only very simple tools because the motor can be assembled by stacking the parts onto each other and securing them for example by gluing, welding or simply spring-loading the parts to each other. This makes it possible to manufacture micromotors at very low cost.

An embodiment of the method according to the invention is characterized in that the first part comprises a silicon substrate and in that the grooves and the chamber are formed by anisotropic etching through a photolithographic mask. As stated before, the processing of silicon results in accurate parts, which further facilitates assembly of the micromotor.

An embodiment of the method according to the invention is characterized in that a lubricating coating or a hard coating is deposited on the first part and second part. It has been found that providing a coating on the walls that support the shaft improves the quality of the bearing. For applications where a low friction is desired, a lubricating coating, for example of PTFE, is preferred. For applications where a long lifetime of the motor is required, a hard coating, for example of $Si_3N_4$, is preferred.

An embodiment of the method according to the invention is characterized in that before stacking of the second part at least one winding is stacked onto the first part. Due to this measure this winding is well protected and can easily be fixed. In addition, the clearance between the shaft and the bounding walls can be adjusted by a suitable choice of the thickness of this winding.

The non-prepublished Patent Application WO IB95/00370 (PHN 14.865) describes a micromotor having two layers which each comprise two V-grooves separated by a chamber. However, these layers neither comprise silicon nor has it been described how this micromotor is manufactured.

BRIEF DESCRIPTION OF THE DRAWINGS

Embodiments of the invention will be described in more detail hereafter, with reference to the drawings, in which.

DESCRIPTION OF THE PREFERRED EMBODIMENTS

Figure 1:
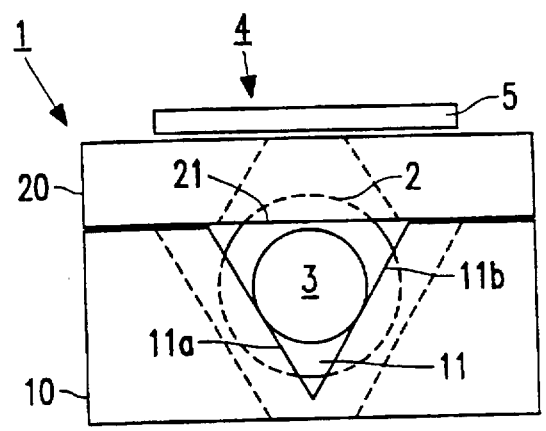
FIG. 1 is a front view of a first embodiment of a micromotor according to the invention.

FIG. 1 is a front view of a first embodiment of the micromotor according to the invention. The micromotor 1 comprises a magnetic rotor 2 which is secured to a shaft 3. The micromotor 1 further comprises a stator 4 having at least one winding, in this case a coil 5. Bearing means have been provided to support the shaft 3 rotatably relative to the stator 4. The bearing means comprise a first part 10, which is a silicon substrate. The silicon substrate 10 comprises at least one groove, in this case a V-groove 11, with a first bounding wall 11a and a second bounding wall 11b. Both bounding walls 11a and 11b extend parallel to the shaft 3. The bearing means further comprise a second part 20, in this case also a silicon substrate, with at least a third bounding wall 21, which also extends parallel to the shaft 3. The shaft 3 is positioned relative to the stator 4 by the bounding walls 11a, 11b and 21.

Figure 2:
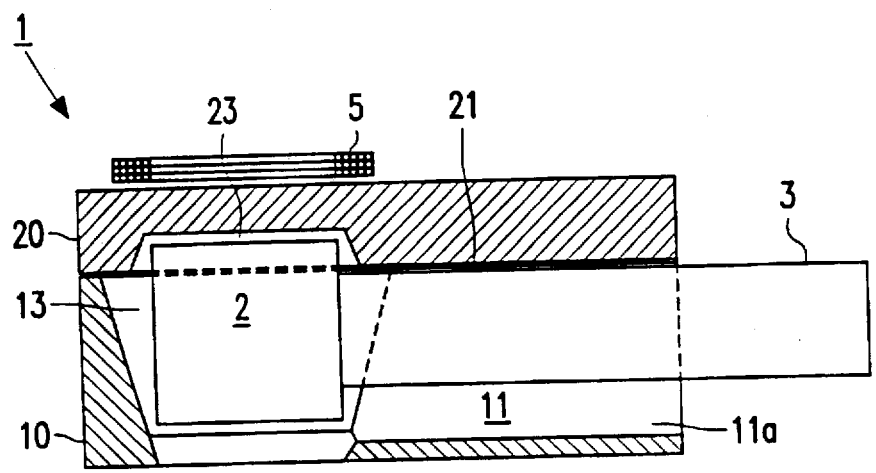
FIG. 2 is a cross-sectional view of the first embodiment shown in FIG. 1.

FIG. 2 is a cross-sectional view of the embodiment of the micromotor 1 shown in FIG. 1. This micromotor 1 comprises a single relatively long V-groove 11 in line with a chamber 13. The V-groove 11 and the chamber 13 are both etched in the first part 10. In the second part 20 a chamber 23 has been etched. This micromotor 1 can be assembled by stacking the rotor 2 and the shaft 3 in the chamber 13 and the groove 11, respectively, after which the second part 20 is stacked onto the first part 10 and the coil 5 is glued onto the second part 20. The first part 10 is fixed to the second part 20 by means of gluing. In this first embodiment of the micromotor 1 the rotor 2 is supported at one side only. Therefore, a relatively long V-groove 11 is required to support the shaft 3. The rotor 2 consists of a permanent magnet which has been radially magnetized. By driving the coil 5 with an alternating current the rotor 2 can be driven. Due to its simple structure the micromotor 1 is easy to assemble by means of a simple tool. Another advantage of this micromotor 1 is that the first part 10 and the second part 20 can be made by processing silicon wafers. In this way many parts can be etched in a single process step so that this micromotor is suited for mass production at low cost. Alternatively, the second part 20 may consist of another material than silicon. However, for the fast part 10 silicon has been found to be the most suitable material because in crystalline silicon (100) V-grooves can be etched with a very high accuracy and with very smooth walls 11a, 11b, so that an accurate bearing is obtained.

Figure 3:
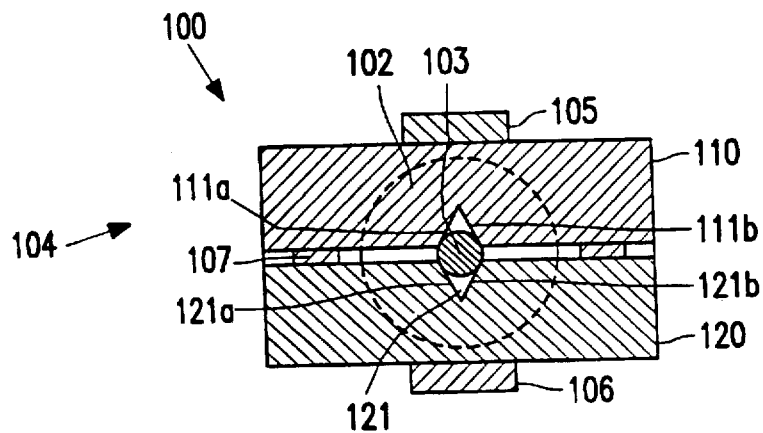
FIG. 3 is a front view of a second embodiment of the micromotor according to the invention.

FIG. 3 is a front view of a second embodiment of the micromotor according to the invention. The micromotor 100 comprises a magnetic rotor 102 secured to a shaft 103 and a stator 104 having a first single winding 105, 106 in a first plane and a second single winding 107 in a second plane. The first plane and the second plane are perpendicular to each other and parallel to the shaft 103. With this winding configuration 105, 106, 107 and a radially magnetized rotor 102 a two-phase motor is obtained. Such a two-phase motor will start more easily than the single-phase micromotor according to the first embodiment.

The shaft 103 is supported rotatably relative to the stator 104 by bearing means which comprise a first part 110 with two V-grooves similar to the V-groove described with reference to the first embodiment of the micromotor according to the invention. In the second embodiment the bearing means comprise a second part 120, which has a groove 121 having a third bounding wall 121a and a fourth bounding wall 121b. By providing a groove, in this case a V-groove 121, in the second part, the fast part 110 and the second part 120 can easily be aligned to each other by means of the shaft 103. Furthermore, the first part 110 and the second part 120 are made identical, which reduces the diversity of the parts of the micromotor 100.

Figure 4:
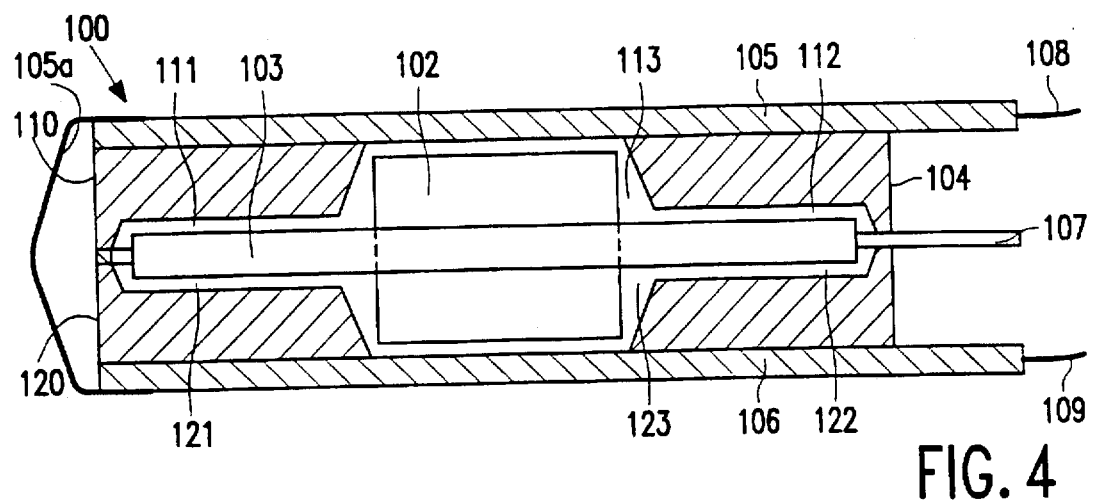
FIG. 4 is a cross-sectional view of the second embodiment of the micromotor shown in FIG. 3.

FIG. 4 is a cross-sectional view of the second embodiment of the micromotor as shown in FIG. 3. This Figure shows that the first part 110 and the second part 120 together form a housing which accommodates the rotor 102. This housing encloses a space formed by a chamber 113 in the first part and a chamber 123 in the second part. The shaft 103, which carries the rotor 102, is supported rotatably relative to the stator 104 at both sides of the rotor 102. At one side of the rotor 102 the shaft 103 is retained in the groove 111 in the first part 110 and the groove 121 in the second part 120. At the other side of the rotor 102 the shaft 103 is retained in the groove 112 in the first part 110 and the groove 122 in the second part 120. One single winding is formed by an electrically conducting strip 105, which is carried by the first part 110, and a second electrically conducting strip 106, which is carried by the second part 120, both strips being connected by an electrical conductor 105a. The winding 105, 105a, 106 can be connected to an electrical power supply (not shown) by means of the leads 108 and 109.

Figure 5:
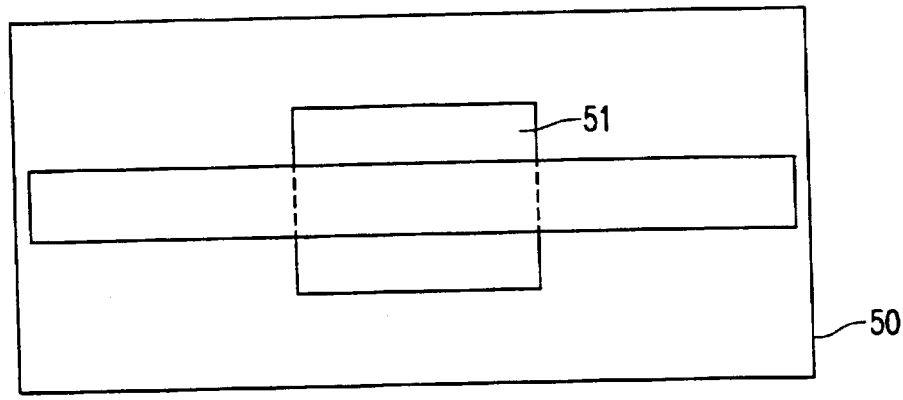
FIG. 5 shows a mask for etching silicon parts for the embodiment of the micromotor shown in FIGS. 3 and 4.
Figure 6:
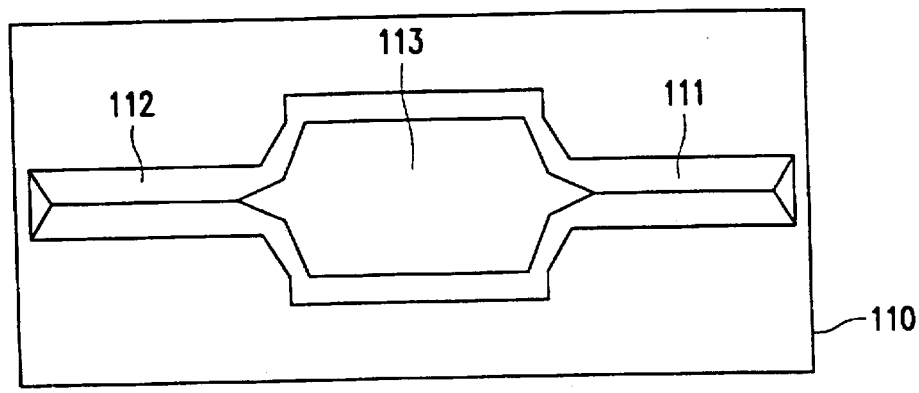
FIG. 6 shows a first silicon part after etching.
Figure 7:
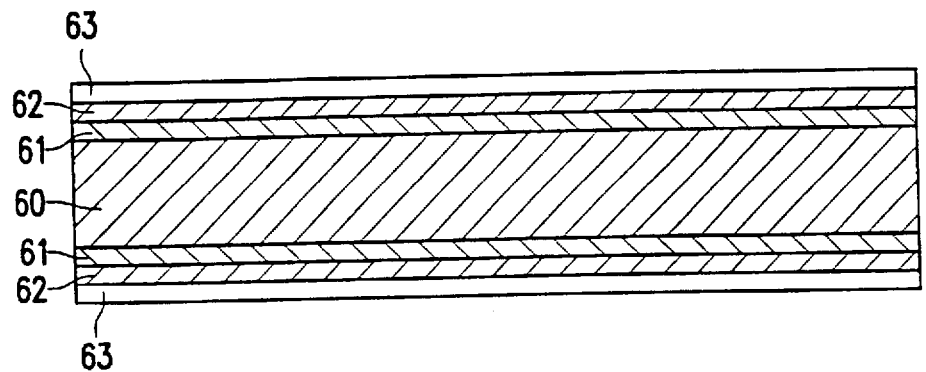
FIGS. 7 to 9 show a silicon wafer after several stages of the method according to the invention.
Figure 8:
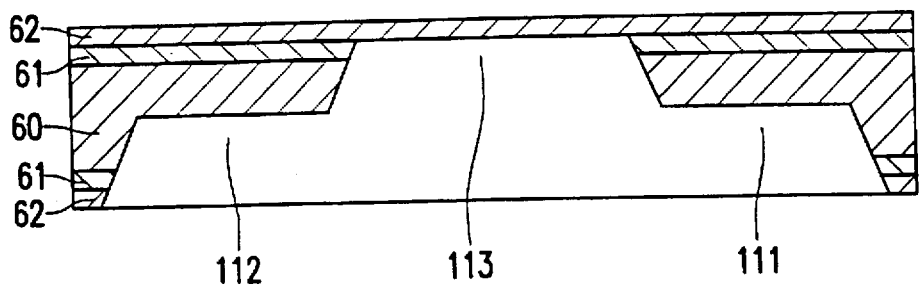
Figure 9:
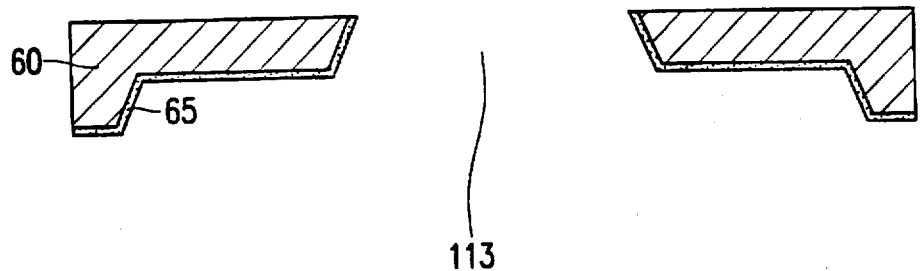

FIG. 5 shows a mask 50 for etching a chamber 113 and two grooves 111 and 112 in line with each other in a silicon substrate 110 (see FIG. 6). When using a silicon substrate 110 with a crystal orientation (100), this will result in a first part 110 as shown in FIGS. 3 and 4. Before etching (see FIG. 7) a thin layer 61 of silicon oxide is deposited on both sides of a silicon wafer 60 (shown partly). Moreover, a second thin layer 62 of silicon nitride is deposited on both sides of the silicon wafer 60 and finally a layer of photoresist 63 is deposited on both sides of the silicon wafer 60. The photoresist layer 63 at one side is exposed using the mask 50 (see FIG. 5) and is developed. Subsequently, the silicon nitride is etched in a $CF_4$ plasma and the silicon oxide is etched in an $HF/H_2O$ solution. After this, the silicon 60 is etched in a KOH solution for more than 12 hours with a result as shown in FIG. 8, wherein the reference numerals correspond to the same features as mentioned above. Finally, the remaining silicon nitride 62 and silicon oxide 61 are removed and the silicon wafer 60 is cut to dies which form the first part 110 and the second part 120 of the second embodiment 100 of the micromotor according to the invention. To improve the quality of the bearing a layer 65 of PTFE or $Si_3N_4$ is deposited on the silicon 60 (see FIG. 9).

Figure 10:
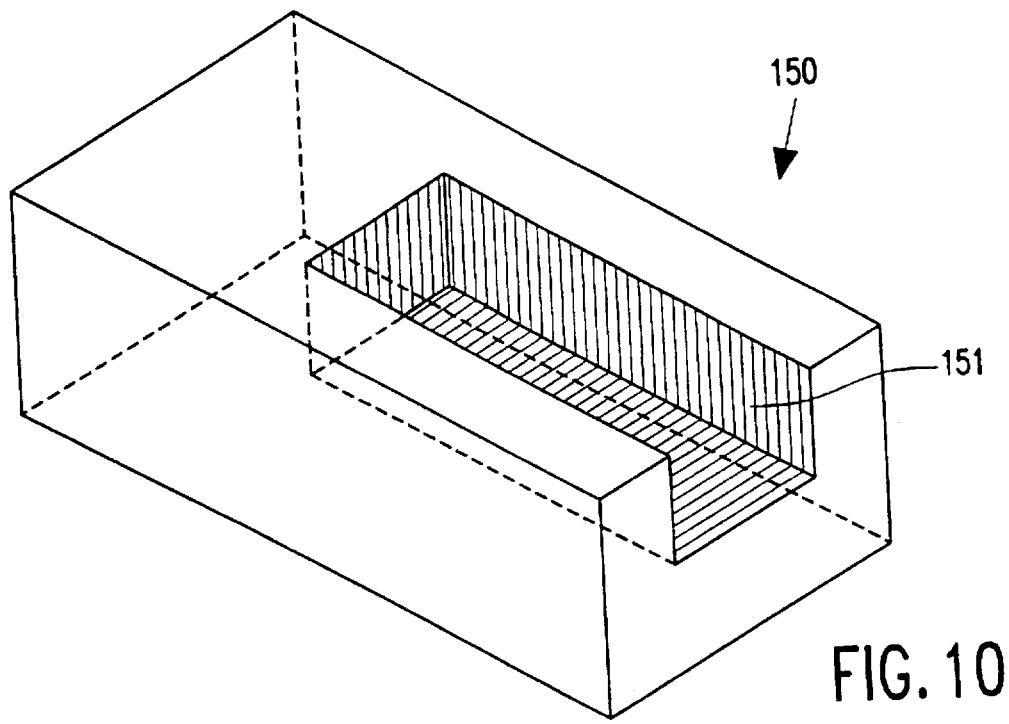
FIG. 10 shows an auxiliary tool.
Figure 11:
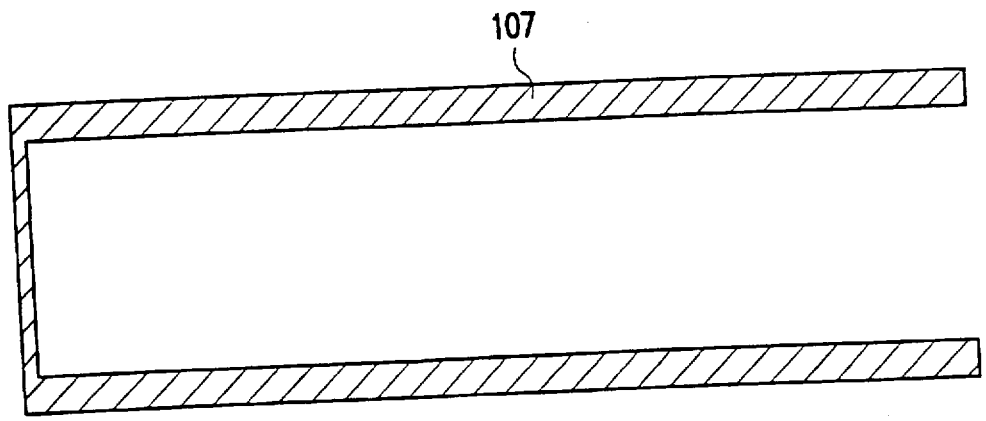
FIG. 11 shows a laser-trimmed copper plate.

According to the method according to the invention a micromotor 100 is manufactured by first forming a chamber 113 and two grooves 111, 112 in line with each other in a first part 110 as described with reference to FIGS. 5 to 9. Secondly, the first part 110 is placed in a chamber 151 of an auxiliary tool 150 (see FIG. 10), after which the rotor 102 secured to the shaft 103 is stacked onto the first part 110. Thus, the rotor 102 is at least partly positioned in the chamber 113 and the shaft 103 is at least partly positioned in the grooves 111 and 112. Optionally, a laser-trimmed copper plate 107 (see FIG. 11), forming at least one winding, is stacked onto the first part 110. Then, a second part 120, identical to the first part 110, is stacked onto the first part 110 such that the V-grooves 111, 112, 121 and 122 retain the shaft 103 (see FIGS. 3 and 4). Finally, the first part 110 is secured to the second part 120 by gluing.

Hereinbefore, the invention has been described for embodiments in which the grooves have a V-shape. However, it is to be noted that grooves not having a V-shape may also be used. For example, when a silicon substrate which is thin relative to the shaft diameter of the micromotor is used, a groove may be open at two sides just as the chamber 113 shown in FIG. 9. In addition, the use of a silicon substrate with a different crystal orientation will result in different groove shapes. Moreover, it is to be noted that the first part can also be secured to the second part by soldering or clamping instead of gluing.

It will thus be seen that the objects set forth above and those made apparent from the preceding description are efficiently attained, and since certain changes can be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

We claim:

1. A micromotor comprising:

a magnetic rotor secured to a shaft;

a stator having at least one winding; and bearings which rotatably support the shaft relative to the stator and which include
a first part made of a silicon substrate and having at least one groove with a first bounding wall and a second bounding wall, said first and second bounding walls of the at least one groove extending parallel to and for engaging the shaft and,
a second part separate from and secured to the first part having at least a third bounding wall extending parallel to the shaft, the shaft being positioned relative to the stator by said first, second and third bounding walls.

2. A micromotor as claimed in claim 1, characterized in that the second part has a groove comprising said third bounding wall and a fourth bounding wall.

3. A micromotor as claimed in claim 1, characterized in that the second part comprises a silicon substrate.

4. A micromotor as claimed in claim 1, characterized in that at least one of the first part and second part carry the at least one winding.

5. A micromotor as claimed in claim 1, characterized in that the first part and the second part (20; 120) together form a housing which accommodates the rotor.

6. A micromotor as claimed in claim 1, characterized in that the first part and the second part each comprise two grooves which are in line with each other, the grooves being separated by a chamber.

7. A micromotor as claimed in claim 1, characterized in that the at least one winding is formed by a first winding in a first plane and a second winding in a second plane, the first plane and the second plane being perpendicular to each other and being parallel to the shaft, said first and second windings each comprising a single turn.

8. The micromotor of claim 1, wherein the at least one groove with first and second bounding walls is V-shaped with the distance between first and second bounding walls being larger than the diameter of the shaft so that the shaft can be engaged by the first and second bounding walls of the at least one groove.

\* \* \* \* \*